United States Patent
Park et al.

(10) Patent No.: US 10,062,405 B2
(45) Date of Patent: Aug. 28, 2018

(54) ELECTRONIC DEVICE AND METHOD FOR OPERATING THE SAME

(71) Applicant: Samsung Electronics Co., Ltd., Suwon-si, Gyeonggi-do (KR)

(72) Inventors: Hyun-Hee Park, Seoul (KR); Jae-Moon Kim, Uiwang-si (KR); Sung-Oh Kim, Suwon-si (KR); Yong-Man Lee, Seongnam-si (KR); Kwang-Tai Kim, Suwon-si (KR); Soo-Hyung Kim, Hwaseong-si (KR); Dong-Hyun Yeom, Bucheon-si (KR); Ki-Huk Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 23 days.

(21) Appl. No.: 15/147,459

(22) Filed: May 5, 2016

(65) Prior Publication Data
US 2016/0329078 A1  Nov. 10, 2016

Related U.S. Application Data

(60) Provisional application No. 62/157,596, filed on May 6, 2015.

(30) Foreign Application Priority Data

Apr. 7, 2016 (KR) .................. 10-2016-0042948

(51) Int. Cl.
  *H04N 9/80* (2006.01)
  *H04N 5/77* (2006.01)
  (Continued)

(52) U.S. Cl.
  CPC ..... *G11B 20/00007* (2013.01); *H04N 19/115* (2014.11); *H04N 19/132* (2014.11);
  (Continued)

(58) Field of Classification Search
  USPC ................................. 386/239–262, 326–342
  See application file for complete search history.

(56) References Cited

U.S. PATENT DOCUMENTS

| | | | |
|---|---|---|---|
| 7,103,100 B1 * | 9/2006 | Tsukagoshi | H04N 21/4143 375/240.12 |
| 2003/0174606 A1 * | 9/2003 | Tsukihashi | G11B 7/00745 369/47.24 |

(Continued)

OTHER PUBLICATIONS

Taeyoung NA et al., A Novel No-Reference PSNR Estimation Method with regard to Deblocking Filtering Effect in H.264/AVC Bitstreams, IEEE Transactions on Circuits and Systems for Video Technology, vol. 24, No. 2, pp. 320-330, Feb. 2, 2014.

*Primary Examiner* — Hung Dang
(74) *Attorney, Agent, or Firm* — Jefferson IP Law, LLP

(57) ABSTRACT

A video compressing apparatus and method that may increase the compression efficiency while maintaining the quality of video on an electronic device processing multimedia data including video are provided. The apparatus includes a video compressing apparatus and method that obtain a target image from a memory or camera, generate meta data corresponding to attribute information of the obtained target image, and compress the target image based on, at least, the generated meta data.

19 Claims, 9 Drawing Sheets
(3 of 9 Drawing Sheet(s) Filed in Color)

(51) Int. Cl.
    *H04N 5/917*         (2006.01)
    *G11B 20/00*         (2006.01)
    *H04N 19/172*        (2014.01)
    *H04N 19/136*        (2014.01)
    *H04N 19/156*        (2014.01)
    *H04N 19/115*        (2014.01)
    *H04N 19/132*        (2014.01)

(52) U.S. Cl.
    CPC ......... *H04N 19/136* (2014.11); *H04N 19/156* (2014.11); *H04N 19/172* (2014.11); *G11B 2020/00072* (2013.01); *G11B 2020/00079* (2013.01)

(56) References Cited

U.S. PATENT DOCUMENTS

| | | | |
|---|---|---|---|
| 2006/0294125 A1* | 12/2006 | Deaven .................. | H04N 19/46 |
| 2010/0166060 A1  | 7/2010  | Ezure et al. | |
| 2011/0047155 A1* | 2/2011  | Sohn ...................... | G10L 19/022 |
| | | | 707/736 |
| 2012/0249844 A1* | 10/2012 | Saito ................... | H04N 5/2355 |
| | | | 348/242 |
| 2013/0051700 A1* | 2/2013  | Jo ....................... | H04N 5/23254 |
| | | | 382/284 |
| 2013/0235072 A1* | 9/2013  | Longhurst ................ | H04N 1/46 |
| | | | 345/605 |

* cited by examiner

ELECTRONIC DEVICE AND METHOD FOR OPERATING THE SAME

CROSS-REFERENCE TO RELATED APPLICATION(S)

This application claims the benefit under 35 U.S.C. § 119(e) of a U.S. Provisional application filed on May 6, 2015 in the U.S. Patent and Trademark Office and assigned Ser. No. 62/157,596, and under 35 U.S.C. § 119(a) of a Korean patent application filed on Apr. 7, 2016 in the Korean Intellectual Property Office and assigned Serial number 10-2016-0042948, the entire disclosure of which is hereby incorporated by reference.

TECHNICAL FIELD

The present disclosure relates to electronic devices and methods for operating the same.

BACKGROUND

Broadcast services supporting various types of multimedia services have recently been converging with communication technologies. Such a video communication service is based on a wideband network supporting high-speed information transfer together with electronic devices capable of quick information processing.

An electronic device supportive of the video communication service may consume a plenty of power due to image processing. In particular, the image resolution may be a critical factor to determine the power consumption of the electronic device upon display. For example, the power consumption of a portable electronic device (hereinafter, a "portable terminal") upon display may increase in proportion to the resolution of image to be processed.

The increase in the image resolution may be a cause of an increase in the storage space or bandwidth over the link to transfer information regarding the to-be-processed image. As an example, the bandwidth for the application processor (AP) in an electronic device to transmit frames to the display device or the bandwidth for an electronic device to transfer multimedia data to another electronic device may increase in proportion to the resolution of display or the size of multimedia data to be transferred.

Users' demand for further enhanced image quality led to portable terminals or other electronic devices being capable of video capturing at high quality/large screen size (up to 4K ultra high definition (UHD), or a few tens of megabits per second (Mbps)). Further, such electronic devices adopt video codec techniques that are based on, e.g., High Efficiency Video Coding (HEVC), presenting enhanced compression efficiency.

However, the electronic devices may consume lots of resources for processing high-quality or high-volume images (e.g., 4K UHD images). For example, in order to perform data computation on a significant amount of data related to conversion or correction of high-quality images, the electronic devices require a relatively large volume of memory or processing resources. An electronic device may use a relatively large amount of networking resources to increase data transmissions or transmission speed so as to transmit a high-volume of images to another electronic device.

Accordingly, there is a need for preparing for a scheme for efficiently compressing a video recorded on an electronic device while maintaining the quality of the video.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a video compressing apparatus and method that may increase the compression efficiency while maintaining the quality of video on an electronic device processing multimedia data including video.

In accordance with an aspect of the present disclosure, a video compressing apparatus and method using meta data on an electronic device processing multimedia data including video are provided.

In accordance with an aspect of the present disclosure, a video compressing apparatus and method that remove unnecessary data from compressed video streams and re-compress the unnecessary data-removed video streams on an electronic device processing multimedia data including video are provided.

In accordance with an aspect of the present disclosure, a compressing apparatus and method that restore compressed video streams based on meta data and then recompress the same on an electronic device processing multimedia data including video are provided.

In accordance with an aspect of the present disclosure, a compressing apparatus and method that retain parameters generated upon obtaining an image on an electronic device and then use the retained parameters to perform compression upon image compression are provided.

In accordance with an aspect of the present disclosure, an electronic device is provided. The electronic device includes a memory, an image signal processor configured to obtain a target image from the memory or a camera functionally connected thereto and to obtain meta data corresponding to attribute information of the obtained target image, and a processor configured to compress the target image based on, at least, the meta data.

In accordance with an aspect of the present disclosure, a method for compressing a video on an electronic device is provided. The method includes obtaining a target image from a memory or a camera, generating meta data corresponding to attribute information of the obtained target image, and compressing the target image based on, at least, the generated meta data, wherein the compressing of the target image may include restoring the compressed target image and recompressing the restored target image based on, at least, previously stored meta data.

In accordance with an aspect of the present disclosure, a computer readable recording medium is provided. The computer readable recoding medium records a program, which when executed by a processor, causes the processor to execute an operation of obtaining a target image from a memory or a camera, an operation of generating meta data corresponding to attribute information of the obtained target image, and an operation of compressing the target image based on, at least, the generated meta data.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
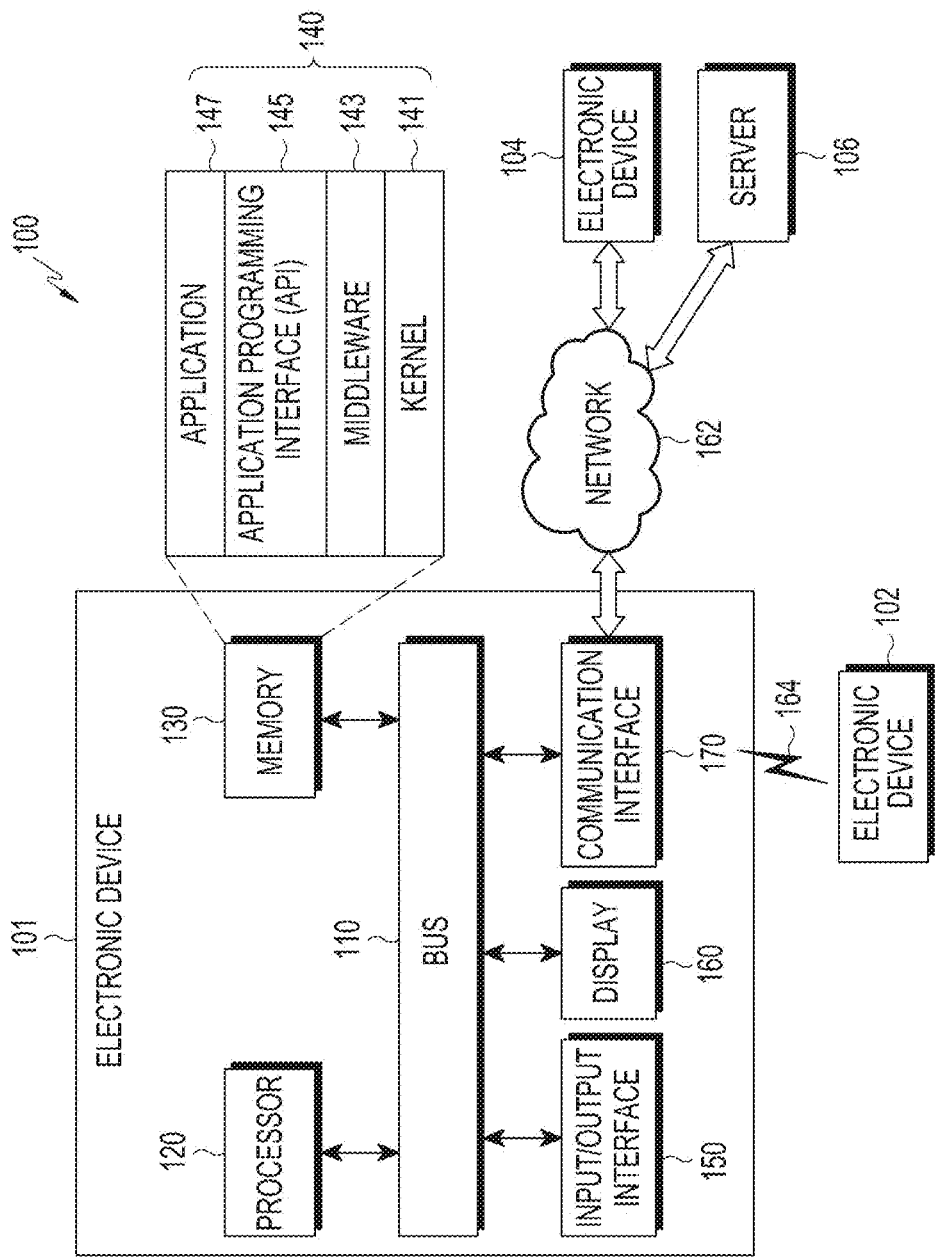
FIG. 1 is a view illustrating a network environment including a wireless terminal according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a central processing unit (CPU) or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an Moving Picture Experts Group phase 1 or phase 2 (MPEG-1 or MPEG-2) audio layer 3 (MP3) player, a mobile medical device, a camera, or a wearable device. According to an embodiment of the present disclosure, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

In some embodiments, the electronic device may be a home appliance. Examples of the home appliance may include at least one of a television, a digital versatile disc (DVD) player, an audio player, a refrigerator, an air conditioner, a cleaner, an oven, a microwave oven, a washer, a drier, an air cleaner, a set-top box, a home automation control panel, a security control panel, a television (TV) box (e.g., Samsung HomeSync™, Apple TV™, or Google TV™) , a gaming console (Xbox™ PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the electronic device may at least one of part of a piece of furniture or building/structure, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

According to an embodiment of the present disclosure, there is prepared a scheme for compressing or recompressing a target image using meta data on an electronic device capable of image processing in order to enhance video compression efficiency.

According to an embodiment of the present disclosure, in order to increase real-time compression efficiency, the electronic device may compress an image recorded through an external or internal camera using meta data. In such case, the electronic device may generate meta data corresponding to the recorded image upon image sensing or image signal processing on the recorded image. The generated meta data may be used for compressing the target image. That is, the electronic device may compress the target image using the generated meta data. The electronic device may record the generated meta data in a separate storage area corresponding to the target image.

According to an embodiment of the present disclosure, in order to efficiently use time and/or resources, the electronic device may recompress the image stored in an external or internal memory using meta data. The image stored in the external or internal memory may be an image compressed by a legacy or proposed scheme. In such case, the electronic device may preferably perform recompression in a preset wait state. The wait state may be a state in which the electronic device may perform recompression while having the least influence on other operations. For example, the wait state may include, e.g., a display off state, charging state, or display off and charging state.

For example, the electronic device may restore the compressed image stored in the memory and recompress the restored image using the meta data corresponding to the compressed image. The meta data corresponding to the compressed image may be generated in real-time or may be previously generated and stored. Upon recompression, the electronic device may recompress the target image in group of picture (GOP) units while maintaining the user's subjective quality or objective quality (peak signal to noise ratio (PSNR) or structural similarity index (SSIM)) at a predetermined level or more. The electronic device may store the recompressed image instead of the existing image stored in the memory. Here, the PSNR may be a value allowing a difference between two different images to be represented using a value, unit, or a number enabling quantitative recognition. The SSIM means a structural similarity index. For example, the SSIM may be of a method measuring the similarity to the original image for a distortion caused by, e.g., compression and conversion, and such method may give a more precise comparison result than a method using mean square error (MSE) or PSNR does.

According to an embodiment of the present disclosure, the electronic device may compress or recompress the target image in the aid of an external electronic device in a predetermined wait state. To that end, the electronic device may provide the target image and meta data corresponding to the target image to the external electronic device. The electronic device may receive the image compressed or recompressed using the meta data from the external electronic device. The electronic device may record the compressed image received from the external electronic device in a designated storage area or store the same instead of the existing image stored in the memory.

The target image may be an image recorded in real-time by a camera or an image stored in the memory. For example, the image stored in the memory may be an image compressed by a legacy or proposed scheme.

The wait state may be a state in which the electronic device may communicate with the external electronic device while having the least influence on other operations. For example, the wait state may include, e.g., a state in which communication may be performed despite display off or a state in which communication may be performed despite display off during charging.

The external electronic device may be, e.g., a cloud server, a home server, a home host computer, or a personal computer.

According to an embodiment of the present disclosure, the meta data referenced to compress the target image may be generated based on the attribute information of the target image. For example, the attribute information of the target image may include a color, brightness, exposure, histogram, region of interest, sharpness, complexity, texture, skin tone, bit rate information, depth, or a combination thereof, as corresponding to the target image.

Hereinafter, electronic devices are described with reference to the accompanying drawings, according to various embodiments of the present disclosure. As used herein, the term "user" may denote a human or another device (e.g., an artificial intelligent electronic device) using the electronic device.

FIG. 1 is a view illustrating an example of a network environment 100 according to an embodiment of the present disclosure.

Referring to FIG. 1, the electronic device 101 in the network environment 100 may include a bus 110, a processor 120, a memory 130, an image processing module 140, an input/output interface 150, a display 160, and a communication interface 170. In some embodiments, the electronic device 101 may exclude at least one of the components or may add another component.

The bus 110 may include a circuit for connecting the components 120 to 170 with one another and transferring communications (e.g., control messages and/or data) between the components.

The processing module 120 may include one or more of a CPU, an application processor (AP), a communication processor (CP), or an image signal processor (ISP). The processor 120 may perform control on at least one of the other components of the electronic device 101 or image signal processing and/or communication-related operation or data processing.

When the ISP is included in the processor 120, the processor 120 may be configured to obtain a target image, generate meta data corresponding to attribute information of the obtained target image, and compress or recompress the target image based on, at least, the generated meta data. The processor 120 may determine a method for compressing or recompressing the target image based on, at least, the meta data.

The processor 120 may obtain the target image using a camera functionally connected therewith or the memory 130. Alternatively, the processor 120 may obtain the target image through a streaming service. The streaming service may include a service for receiving image data from the external electronic device 102 or 104 or the server 106 through the communication interface 170.

The processor 120 may generate the meta data using the attribute information of the obtained target image. The attribute information of the obtained target image may include a color, brightness, exposure, histogram, region of interest, sharpness, complexity, texture, skin tone, bit rate information, depth, or a combination thereof, as corresponding to the target image.

According to an embodiment of the present disclosure, the processor 120 may utilize the meta data generated in the ISP (or image sensor) before compression in order to increase compression efficiency upon real-time video compression.

According to an embodiment of the present disclosure, the processor 120 may recompress the target image while maintaining the user's subjective quality or objective quality (PSNR or SSIM) at a predetermined level or more in order to efficiently create the compressed video stream. In such case, use of meta data (e.g., rate control, mode decision, or texture information) obtained during image signal processing performed prior to the image compression may enhance the video compression efficiency.

The processor 120 may perform the operation of obtaining the target image in parallel with the operation of generating the meta data. Before compressing the target image, the processor 120 may identify state information on the electronic device 101 and determine whether the identified state information meets a designated condition. In other words, the processor 120 may compress the target image only when the state information on the electronic device 101 meets the designated condition. For example, the state information may include the remaining space of the memory 130, image signal processing capability, processable image signal data amount, charging state of the electronic device 101, the external electronic device connected with the electronic device 101, or a combination thereof.

The processor 120 may determine whether the remaining memory space is within a predetermined range based on, e.g., the remaining memory space information included in the state information and may compress the target image only when the remaining memory space is within the predetermined range.

For example, as at least a portion of the operation of compressing the target image, the processor 120 may be configured to vary at least one of the resolution for at least some section of the target image, image bit rate, image bit depth, image frame rate, image color space, voice bit rate, voice bit depth, and voice sample rate and determine the compression rate for the at least some section based on information according to the variation.

For example, the processor 120 may be configured to compress a first section of the target image by a first scheme and a second section of the target image by a second scheme. In such case, the processor 120 may generate the meta data with a first meta data corresponding to the first section and second meta data corresponding to the second section. The processor 120 may generate the first meta data by referencing the first scheme and the second meta data by referencing the second scheme.

As at least a portion of the operation of compressing the target image, the processor 120 may determine the first scheme or the second scheme so that a result of compressing the first section or the second section meets a preset image quality. For example, the processor 120 may identify a section including a region of interest among at least some sections of the target image and determine a scheme for compressing the target image using a bit rate of a level designated for the identified section including the region of interest.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

According to an embodiment of the present disclosure, the memory 130 may store meta data and/or compressed or uncompressed image data in the area designated by the processor 120. For example, the memory 130 may store the meta data as at least a portion of the target image.

The memory 130 may read the image and/or meta data stored in the designated area in response to a request from the processor 120 and provide the same to the processor 120. The memory 130 may record the image recompressed by the processor 120 instead of the existing recorded image.

The electronic device 101, unless the processor 120 includes the ISP, may separately have an image processing module 140. In such case, the image processing module 140 may instead perform the image signal processing operation by the processor 120.

Although in FIG. 1 the image processing module 140 is provided as a component independent from the processor 120 and the memory 130, various embodiments are not limited thereto. The image processing module 140 may be integrated with, e.g., the processor 120, or may be stored in software in the memory 130 to be executable by the processor 120. Further, the image processing module 140 may be distributively implemented in, e.g., the processor 120 and the memory 130. In such case, the operation of generating meta data for image signal processing may be performed by the image processing module 140, and the operation of compressing the target image based on, at least, the generated meta data may be performed by the processor 120.

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application program 147 to access the individual components of the electronic device 101 to control or manage the system resources.

The middleware 143 may function as a relay to allow the API 145 or the application program 147 to communicate data with the kernel 141, for example.

Further, the middleware 143 may process one or more task requests received from the application program 147 in order of priority. For example, the middleware 143 may assign at least one of application programs 147 with priority of using system resources (e.g., the bus 110, processor 120, or memory 130) of at least one electronic device 101. For example, the middleware 143 may perform scheduling or load balancing corresponding to one or more task requests by processing the one or more task requests according to the priority assigned to the at least one application program.

The API 145 is an interface allowing the application program 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device. For example, the input/output interface 150 may include multiple image sensors. The multiple image sensors included in the input/output interface 150 may have different characteristics. The input/output interface 150 may transfer images recorded by the multiple image sensors to the image processing module 140, the memory 130, the display 160, and the communication interface 170 via the bus 110. The recorded images may have different image characteristics. This may be attributed to differences in, e.g., image sensor characteristics or conditions set for taking images.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols). The display 160 may include a touchscreen and may receive, e.g., a touch, gesture, proximity or hovering input using an electronic pen or a body portion of the user.

For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device.

The wireless communication may be a cellular communication protocol and may use at least one of, e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). Further, the wireless communication may include, e.g., short-range communication 164. The short-range communication 164 may include at least one of, e.g., wireless fidelity (Wi-Fi), Bluetooth, near-field communication (NFC), magnetic stripe transmission (MST), or Zigbee. The wireless communication may use, e.g., GPS or global navigation satellite system (GNSS). The wired connection may include at least one of universal serial bus (USB), high definition multimedia interface (HDMI), recommended standard 232 (RS-232), or plain old telephone service (POTS). The network 162 may include at least one of communication networks, e.g., a computer network (e.g., local area network (LAN) or wide area network (WAN)), Internet, or a telephone network.

According to an embodiment of the present disclosure, the communication interface 170 may send a request for compressing the target image to the external electronic device 102 or 104 or the server 106 in response to control from the processor 120. To that end, the communication interface 170 may provide the external electronic device with the target image and/or meta data corresponding to the target image. The communication interface 170 may receive the compressed image provided from the external electronic device 102 or 104 or the server 106 and transfer the received compressed image to the processor 120.

The first and second external electronic devices 102 and 104 each may be a device of the same or a different type from the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
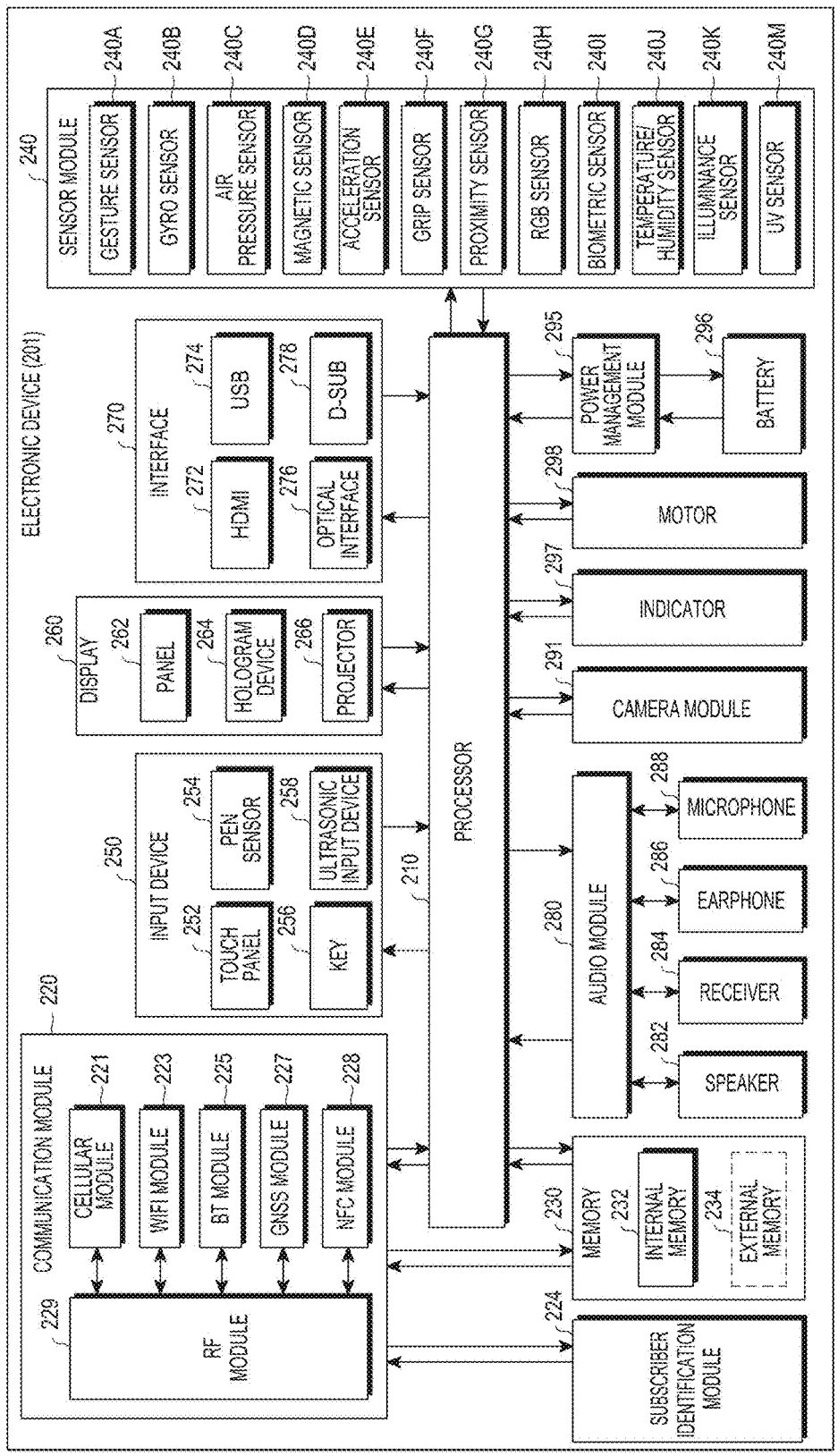
FIG. 2 is a block diagram illustrating an electronic device according to an embodiment of the present disclosure.

FIG. 2 is a view illustrating a configuration of an electronic device 201 according to an embodiment of the present disclosure.

Referring to FIG. 2, the electronic device 201 may include the whole or part of, e.g., the electronic device 101 shown in FIG. 1. The electronic device 201 may include one or more processors (e.g., APs) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware and software components connected to the processor 210 by running, e.g., an operating system or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store various data in the non-volatile memory.

According to an embodiment of the present disclosure, the processor 210 may be configured to perform all of the operations performed by the processor 120 and/or the image processing module 140 described above in connection with FIG. 1. The same detailed description given above in connection with FIG. 1 may apply, and thus, is not repeatedly given herein.

The communication module 220 may have the same or similar configuration to the communication interface 170 of FIG. 1. The communication module 220 may include, e.g., a cellular module 221, a Wi-Fi module 223, a Bluetooth (BT) module 225, a GPS module 227, a NFC module 228, and a radio frequency (RF) module 229.

The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment of the present disclosure, the cellular module 221 may perform at least some of the functions providable by the processor 210. According to an embodiment of the present disclosure, the cellular module 221 may include a communication processor (CP).

The Wi-Fi module 223, the Bluetooth module 225, the GPS module 227, or the NFC module 228 may include a process for, e.g., processing data communicated through the module. At least some (e.g., two or more) of the cellular module 221, the Wi-Fi module 223, the Bluetooth module 225, the GPS module 227, or the NFC module 228 may be included in a single integrated circuit (IC) or an IC package.

The RF module 229 may communicate data, e.g., communication signals (e.g., RF signals). The RF module 229 may include, e.g., a transceiver, a power amplifier module (PAM), a frequency filter, a low noise amplifier (LNA), or an antenna. According to an embodiment of the present disclosure, at least one of the cellular module 221, the Wi-Fi module 223, the BT module 225, the GPS module 227, or the NFC module 228 may communicate RF signals through a separate RF module.

According to an embodiment of the present disclosure, the communication module 220 may be configured to perform the same operations as those performed by the communication interface 170 of FIG. 1. In other words, the communication module 220 may send a request for compressing the transmission to the external electronic device in response to control from the processor 210. To that end, the communication module 220 may provide the external electronic device with the target image and/or meta data corresponding to the target image. The communication module 220 may receive the compressed image provided from the external electronic device and transfer the received compressed image to the processor 210.

The subscription identification module 224 may include, e.g., a card including a subscriber identification module and/or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The memory 230 may record the target image and/or meta data corresponding to the target image in a designated area in response to the control of the processor 210. The memory 230 may read a particular target image and/or meta data corresponding to the particular target image in response to the control of the processor 210 and provide the read particular target image and/or meta data corresponding to the particular target image to the processor 210.

The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 234 may include a flash drive, e.g., a compact flash (CF) memory, a secure digital (SD) memory, a micro-SD memory, a min-SD memory, an extreme digital (xD) memory, a multi-media card (MMC), or a memory stick™. The external memory 234 may be functionally and/or physically connected with the electronic device 201 via various interfaces.

For example, the sensor module 240 may measure a physical quantity or detect a motion state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a biometric sensor 240I, a temperature/humidity sensor 240J, an illumination sensor 240K, or an Ultra Violet (UV) sensor 240M. Additionally or alternatively, the sensing module 240 may include, e.g., an E-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 2701 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction.

The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone 288 to identify data corresponding to the sensed ultrasonic wave.

The display 260 may include a panel 262, a hologram device 264, or a projector 266.

The panel 262 may have the same or similar configuration to the display 160 of FIG. 1. The panel 262 may be implemented to be flexible, transparent, or wearable. The panel 262 may also be incorporated with the touch panel 252 in a module.

According to an embodiment of the present disclosure, the panel 262 may include at least one sensor. For example, the panel 262 may include a pressure sensor (or force sensor). The pressure sensor may be a sensor capable of measuring the strength of a pressure for the user's touch. The pressure sensor may be implemented in a single body with the touch panel 252 or may be implemented in one or more sensors separate from the touch panel 252.

The hologram device 264 may make three dimensional (3D) images (holograms) in the air by using light interference. The projector 266 may display an image by projecting light onto a screen. The screen may be, for example, located inside or outside of the electronic device 201. In accordance with an embodiment, the display 260 may further include a control circuit to control the panel 262, the hologram device 264, or the projector 266.

The interface 270 may include e.g., a HDMI 272, a USB 274, an optical interface 276, or a D-subminiature (D-sub) 278. The interface 270 may be included in e.g., the communication interface 170 shown in FIG. 1. Additionally or alternatively, the interface 270 may include a Mobile High-definition Link (MHL) interface, a SD card/MMC interface, or Infrared Data Association (IrDA) standard interface.

The audio module 280 may convert, e.g., a sound signal into an electrical signal and vice versa. At least a part of the audio module 280 may be included in e.g., the input/output interface 150 as shown in FIG. 1. The audio module 280 may process sound information input or output through e.g., a speaker 282, a receiver 284, an earphone 286, or a microphone 288.

For example, the camera module 291 may be a device for recording still images and videos, and may include, according to an embodiment of the present disclosure, one or more image sensors (e.g., front and back sensors), a lens, an Image signal processor (ISP), or a flash such as an LED or xenon lamp. That is, the camera module 291 may include image sensors having different characteristics. The different characteristics may be factors or requirements for determining characteristics of a recorded image, which may include characteristics regarding the type (e.g., black-and-white or color) of image, resolution, or view angle.

The power manager module 295 may manage power of the electronic device 201, for example. Although not shown, according to an embodiment of the present disclosure, the power management module 295 may include a power management integrated circuit (PMIC), a charger IC, or a battery 296 or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. Although not shown, a processing unit for supporting mobile TV, such as a GPU may be included in the electronic device 201. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

Figure 3:
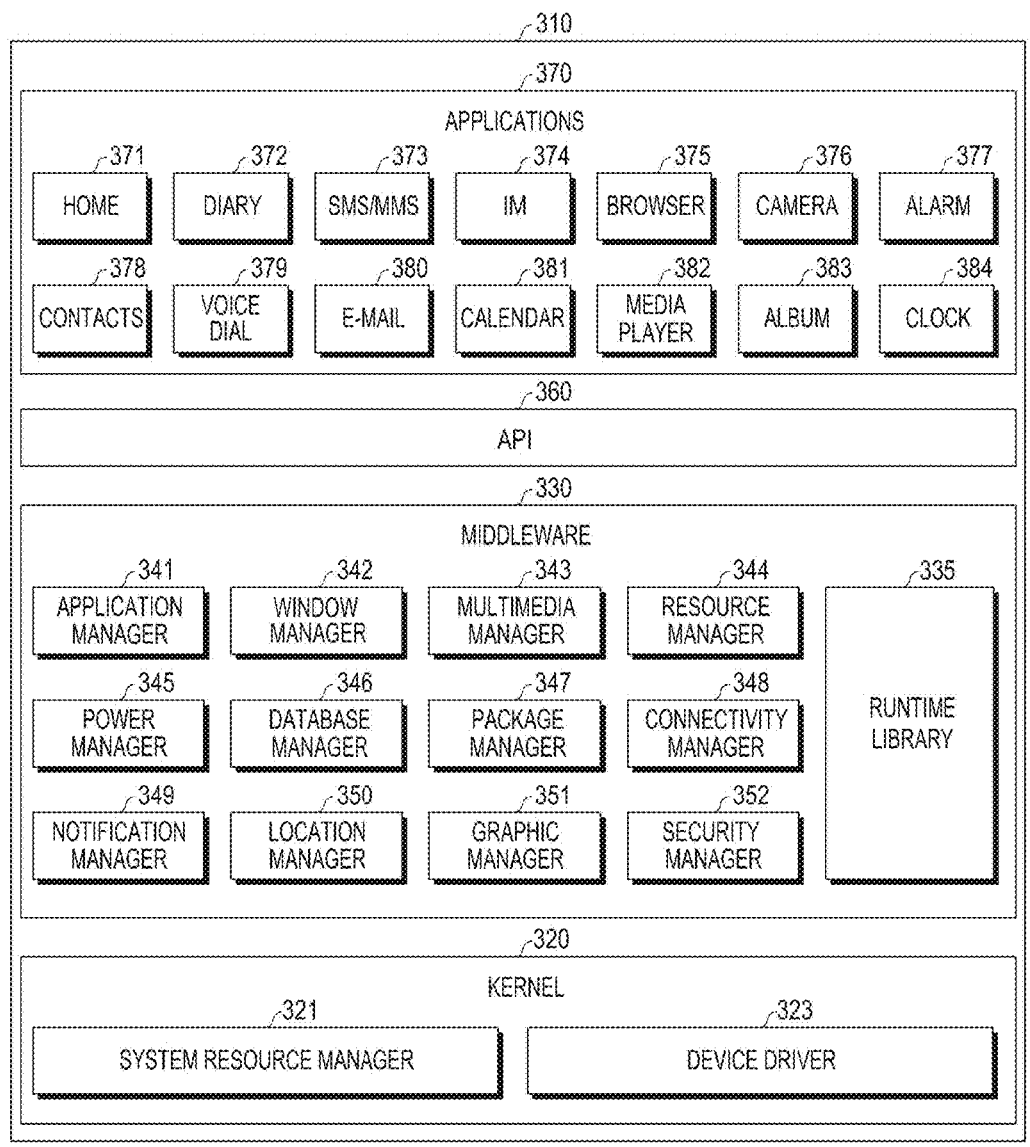
FIG. 3 is a block diagram illustrating a program module according to an embodiment of the present disclosure.

FIG. 3 is a view illustrating a configuration of a program module according to an embodiment of the present disclosure.

According to an embodiment of the present disclosure, the program module 310 (e.g., the program 140) may include an OS controlling resources related to the electronic device and/or various applications (e.g., the application program 147) driven on the operating system. The operating system may include, e.g., Android, iOS, Windows, Symbian, Tizen, or Bada.

The program 310 may include, e.g., a kernel 320, middleware 330, an API 360, and/or an application 370. At least a part of the program module 310 may be preloaded on the electronic device or may be downloaded from an external electronic device (e.g., the electronic devices 102 and 104 or server 106).

The respective examples of the kernel 320, middleware 330, API 360, and application 370 included in the program module 310 may be the kernel 141, middleware 143, API 145, and application program 147 included in the program 140 of FIG. 1.

The kernel 320 may include, e.g., a system resource manager 321 or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly required by applications 370. According to an embodiment of the present disclosure, the middleware 2030 (e.g., the middleware 330) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or operation on arithmetic functions.

The application manager 341 may manage the life cycle of at least one application of, e.g., the applications 370. The window manager 342 may manage GUI resources used on the screen. The multimedia manager 343 may grasp formats necessary to play various media files and use a codec appropriate for a format to perform encoding or decoding on media files. The resource manager 344 may manage resources, such as source code of at least one of the applications 370, memory or storage space.

The power manager 345 may operate together with, e.g., a basic input/output system (BIOS) to manage battery or power and provide power information necessary for operating the electronic device. The database manager 346 may generate, search, or vary a database to be used in at least one of the applications 370. The package manager 347 may manage installation or update of an application that is distributed in the form of a package file.

The connectivity manager 348 may manage wireless connectivity, such as, e.g., Wi-Fi or Bluetooth. The notification manager 349 may display or notify an event, such as a coming message, appointment, or proximity notification, of the user without interfering with the user. The location manager 350 may manage locational information on the electronic device. The graphic manager 351 may manage graphic effects to be offered to the user and their related user interface. The security manager 352 may provide various security functions necessary for system security or user authentication. According to an embodiment of the present disclosure, when the electronic device has telephony capability, the middleware 330 may further include a telephony manager for managing voice call or video call functions of the electronic device.

The middleware 330 may include a middleware module forming a combination of various functions of the above-described components. The middleware 330 may provide a specified module per type of the operating system in order to provide a differentiated function. Further, the middleware 330 may dynamically omit some existing components or add new components.

The API 360 may be a set of, e.g., API programming functions and may have different configurations depending on operating systems. For example, in the case of Android or iOS, one API set may be provided per platform, and in the case of Tizen, two or more API sets may be offered per platform.

The application 370 may include one or more applications that may provide functions such as, e.g., a home 371, a diary 372, an short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384. The application 370 may also include an application that may perform functionality such as health-care (e.g., measuring the degree of workout or blood sugar), or provision of environmental information (e.g., provision of air pressure, moisture, or temperature information).

According to an embodiment of the present disclosure, the application 370 may include an application (hereinafter, "information exchanging application" for convenience) supporting information exchange between the electronic device (e.g., the electronic device 101) and an external electronic device. Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device. Further, the notification relay application may receive notification information from, e.g., the external electronic device and may provide the received notification information to the user.

The device management application may perform at least one function of the external electronic device communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the application 370 may include an application (e.g., a health-care application of a mobile medical device) designated according to attribute information of the external electronic device. According to an embodiment of the present disclosure, the application 370 may include an application received from the external electronic device. According to an embodiment of the present disclosure, the application 370 may include a preloaded application or a third party application downloadable from a server. The names of the components of the program module 310 according to the shown embodiment may be varied depending on the type of operating system.

According to an embodiment of the present disclosure, at least a part of the program module 310 may be implemented in software, firmware, hardware, or in a combination of two or more thereof. At least a part of the programming module 310 may be implemented (e.g., executed) by e.g., a processor (e.g., the processor 210). At least a part of the program module 310 may include e.g., a module, program, routine, set of instructions, process, or the like for performing one or more functions.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out various embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s). The embodiments disclosed herein are proposed for description and understanding of the disclosed technology and does not limit the scope of the present disclosure. Accordingly, the scope of the present disclosure should be interpreted as including all changes or various embodiments based on the technical spirit of the present disclosure.

Figure 4:
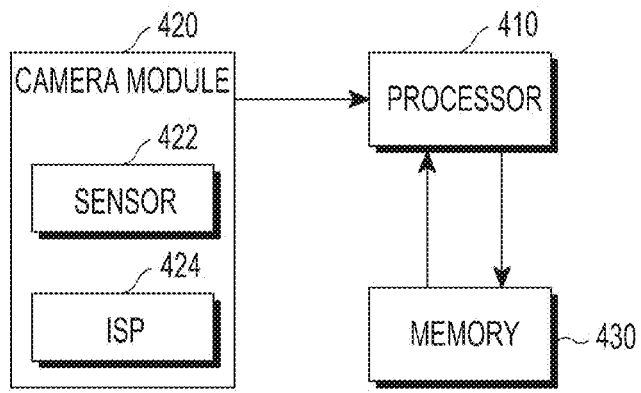
FIG. 4 is a view illustrating an example of a configuration of a video compressing apparatus performing video compression on an electronic device according to an embodiment of the present disclosure.

FIG. 4 is a view illustrating a configuration for image compression on an electronic device according to an embodiment of the present disclosure.

Referring to FIG. 4, the electronic device may include a processor 410 for image compression, a camera module 420, and a memory 430. The camera module 410 may include a sensor 422 and an ISP 424.

The processor 410 may receive a target image to be compressed or recompressed from the camera module 420 or the memory 430. The processor 410 may receive the target image to be compressed or recompressed in predetermined units (e.g., GOP). The processor 410 may also receive the target image to be compressed or recompressed from an external electronic device or external storage medium based on a streaming service.

The processor 410 may compress in realtime the target image provided from the camera module 420 based on, at least, meta data. The processor 410 may restore the target image provided from the memory 430 and recompress the restored target image based on, at least, the meta data. The meta data may be provided from the camera module 420, the memory 430, external memory, or external device.

According to an embodiment of the present disclosure, the processor 410 may obtain the meta data to be considered to compress the target image from the sensor 422 (e.g., an image sensor) or ISP 424 of the camera module 420 or may generate the meta data using the attribute information of the target image obtained from the camera module 420.

The processor 410 may compress in realtime the target image based on a constant bitrate (CBR) scheme or variable bitrate (VBR) scheme.

The CBR scheme is a scheme in which a bit stream to be compressed is compressed from its head to tail at the same bitrate. Generally, upon image compression, the CBR scheme applies, and in this case, compression may be done within a short time. However, compression of a video containing many motions may cause a deterioration of image quality.

The VBR scheme supports compression largely in three types. For example, it may come in three types including "average," "max," and "min." Compression may be performed at the average bitrate in normal cases, at the max bitrate when more motions are included, and at the min bitrate when fewer motions are included. In other words, the VBR scheme may perform schematic compression (hereinafter, "simple VBR compression") on the entire target image, and then, may additionally perform detailed compression (hereinafter, "additional VBR compression") on the target image.

Accordingly, the VBR scheme may generate a compressed image with relatively smaller volume and higher quality as compared with the CBR scheme. However, the VBR scheme may suffer from relatively complicated compression tasks and increased time consumption for compression tasks as compared with the CBR scheme.

According to an embodiment of the present disclosure, the processor 410 may perform recompression on an image already compressed in the CBR scheme or an image that has undergone the simple VBR compression based on, at least, meta data. When the target compressed image for recompression is generated by the simple VBR compression, the processor 410 may perform recompression by the additional VBR compression. In such case, although compression is performed in the VBR scheme, the additional VBR compression may be performed in the wait state, addressing the problem that time consumption increases due to application of the VBR scheme.

As set forth supra, the processor 410 may be configured to compress or recompress images by referencing meta data in realtime or previously generated meta data without the need for analyzing and recompressing compressed images.

The processor 410 may generate the meta data using the attribute information of the obtained target image. The attribute information of the obtained target image may include a color, brightness, exposure, histogram, region of interest, sharpness, complexity, texture, skin tone, bit rate information, depth, or a combination thereof, as corresponding to the target image.

According to an embodiment of the present disclosure, in order to increase compression efficiency upon real-time video compression, the processor 410 may utilize, for the image compression, meta data obtained from the sensor 422 (e.g., an image sensor) or ISP 424 of the camera module 420 before compression or meta data obtained from the memory 430 or external memory or external device.

According to an embodiment of the present disclosure, the processor 410 may recompress the target image while maintaining the user's subjective quality or objective quality (PSNR or SSIM) at a predetermined level or more in order to efficiently create the compressed video stream. In such case, use of meta data (e.g., rate control, mode decision, or texture information) obtained during image signal processing performed prior to the image compression may enhance the video compression efficiency.

The processor 410 may perform the operation of obtaining the target image in parallel with the operation of generating the meta data. This is for generating meta data in realtime.

Before compressing the target image, the processor 410 may identify state information on the electronic device and determine whether the identified state information meets a designated condition. This is for determining whether to perform the additional VBR compression on the compressed image obtained through the CBR scheme-based compression or simple VBR compression, using the meta data. The state information may be triggered for the additional compression.

The processor 410 may compress the target image only when the state information on the electronic device meets a designated condition. The state information may include the remaining space of the memory, image signal processing capability, processable image signal data amount, charging state of the electronic device, the external electronic device connected with the electronic device, or a combination thereof.

The processor 410 may determine whether the remaining memory space is within a predetermined range based on, e.g., the remaining memory space information included in the state information and may compress the target image only when the remaining memory space is within the predetermined range.

The processor 410 may recognize a server (e.g., a cloud server) connected through the network and may provide the recognized server with an uncompressed image or a compressed image that has undergone simple compression (CBR scheme-based compression or simple VBR compression). In such case, the recompression on the compressed image that has been subjected to simple compression may be performed by the server. The processor 410 may receive the compressed image that has been subjected to recompression through the network from the server.

The processor 410 may monitor the state of the memory 430, and upon determining that the memory 430 has an insufficient storage space, the processor 410 may trigger a recompression operation.

For example, as at least a portion of the operation of compressing the target image, the processor 410 may be configured to vary at least one of the resolution for at least some section of the target image, image bit rate, image bit depth, image frame rate, image color space, voice bit rate, voice bit depth, and voice sample rate and determine the compression rate for the at least some section based on information according to the variation.

The processor 410 may divide the target image into a first section and a second section and may apply different compression rates to the first and second section, respectively.

To that end, the processor 410 may be configured to compress the first section by a first scheme and the second section by a second scheme. In such case, the processor 410 may generate the meta data with a first meta data corresponding to the first section and second meta data corresponding to the second section. The processor 410 may generate the first meta data by referencing the first scheme and the second meta data by referencing the second scheme.

As at least a portion of the operation of compressing the target image, the processor 410 may determine the first scheme or the second scheme so that a result of compressing the first section or the second section meets a preset image quality. This is for allowing the compressed images corresponding to the first section and second section to remain at similar quality levels.

The processor 410 may identify a section including a region of interest among at least some sections of the target image and determine a scheme for compressing the target image using a bit rate of a level designated for the identified section including the region of interest.

The memory 430 may include a volatile and/or non-volatile memory. The memory 430 may store meta data and/or compressed or uncompressed image data in the area designated by the processor 410. For example, the memory 430 may store the meta data as at least a portion of the target image. Here, the whole or part of the target image may be stored in the memory 430, and the whole or part of meta data may be stored in the memory 430.

The memory 430 may read the image and/or meta data stored in the designated area in response to a request from the processor 410 and provide the same to the processor 410. The memory 430 may record the image recompressed by the processor 410 instead of the existing recorded image. The meta data may be recorded in the memory 430 as part of the target image.

Figure 5:
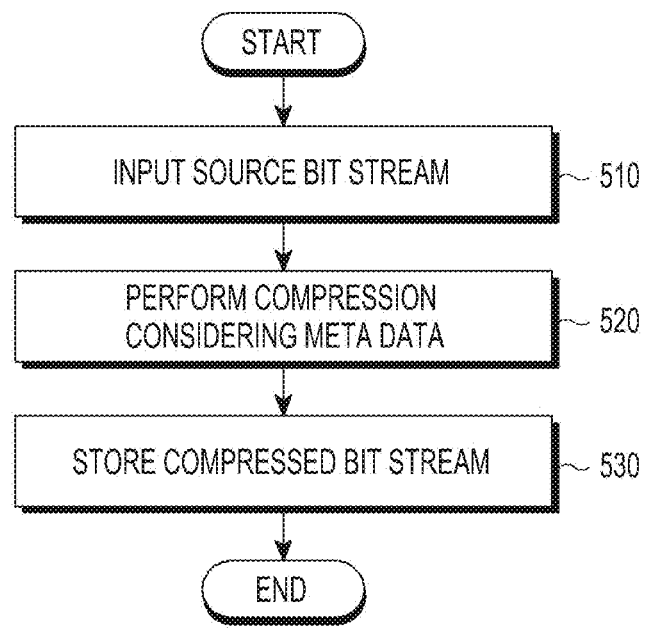
FIG. 5 is a flowchart illustrating the control performed on an electronic device according to an embodiment of the present disclosure.

FIG. 5 is a flowchart illustrating the control performed on an electronic device according to an embodiment of the present disclosure.

Referring to FIG. 5, in operation 510, the electronic device may receive a source bit stream. The source bit stream may indicate a bit stream corresponding to a target image for compression or recompression.

According to an embodiment of the present disclosure, the source bit stream may be captured by an internal or external camera and provided through an image sensor, selected from bit streams recorded in the internal or external memory, or provided through the network based on a streaming service. The source bit stream may be provided in predetermined units (e.g., GOP) for compression or recompression.

The electronic device may compress or recompress the source bit stream based on, at least, meta data in operation 520. The compression may be compression performed in realtime and may correspond to CBR scheme-based compression or simple VBR compression.

According to an embodiment of the present disclosure, the electronic device may compress images recorded by the camera in realtime considering meta data. For example, the meta data may be generated upon image signal processing on the source bit stream provided from the camera or may be generated by a sensor (an image sensor). The generated meta data may be processed for efficient use in realtime compression. The processing may use meta data to exclude duplicate computation during the computation performed upon image signal processing or the computation performed upon compression. That is, the electronic device, when able to obtain the meta data among the information obtained through the computation for compression, may omit the computation. This leads to a reduced amount of computation upon compression.

The electronic device may perform the operation of obtaining the target image in parallel with the operation of generating the meta data. This is for generating meta data in realtime.

Further, the electronic device may maintain the image quality of compressed image by controlling the bitrate based on the VBR scheme upon realtime compression.

Specifically, the electronic device may receive meta data to be considered for compressing the source bit stream from a sensor (e.g., an image sensor) of the camera module or may generate the meta data using the attribute information of the source bit stream.

The attribute information of the obtained source bit stream may include a color, brightness, exposure, histogram, region of interest, sharpness, complexity, texture, skin tone, bit rate information, depth, or a combination thereof, as corresponding to the source bit stream.

The electronic device may compress the source bit stream in realtime based on the CBR scheme or VBR scheme. Here, the VBR scheme-based realtime compress may correspond to the simple VBR compression.

According to an embodiment of the present disclosure, the electronic device may recompress the compressed image provided from the memory or through a streaming service considering the meta data. Here, the meta data may be generated upon compression and previously stored. For recompression, the electronic device may obtain a restored image by restoring the source bit stream.

The electronic device may assess the image quality of the restored image and may detect a high-quality coded area in the restored image based on a result of the assessment. The electronic device may detect a high-quality coded area having an image quality higher than a predetermined reference by measuring the image quality of the restored image. For example, the electronic device may measure the image quality of the restored image based on a PSNR scheme or SSIM scheme and detect the high-quality coded area based on the measured result.

The electronic device may configure a new compression condition for the target image to be recompressed in the restored image based on the image quality of the restored image that has been assessed. For example, the electronic device may determine a quantization parameter (QP) as the compression condition. Here, the QP denotes a value that may be optionally set to adjust the degree of quantization. As an example, adjustment of the QP may lead to the adjustment of image quality.

The electronic device may recompress the source bit stream having a size corresponding to a predetermined unit, i.e., a GOP unit of frame data (restored image), based on the newly determined compression condition and meta data. The electronic device may assess image quality reception until the recompression on the entire frame data of a GOP unit is complete, configures a new compression condition for the area to be recompressed based on the assessment, and repeat the recompressing operation based on the same.

The electronic device, when the frame data of a GOP unit is completely compressed, determines whether there is a GOP unit of source bit stream to be compressed next. When there is a source bit stream to be recompressed, the electronic device may repeat the above-described operations to recompress the source bit stream.

As set forth supra, the electronic device may be configured to compress or recompress images by referencing meta data in realtime or previously generated meta data without the need for analyzing and recompressing compressed images.

In sum, the electronic device assesses the image quality of video through the result of analysis of previously restored images and images restored in GOP units in the quality assessment operation. Here, the electronic device may perform a scheme for inferring an objective image quality, such as PSNR. Different assessment methods may come in availability depending on implementations. When the assessed image quality is higher than a reference image quality, the QP may be adjusted on a per-slice or block basis to eliminate excessive information from the user's point of view, thereby reducing the amount of data by compression.

According to an embodiment of the present disclosure, the electronic device may recompress the target image while maintaining the user's subjective quality or objective quality (PSNR or SSIM) at a predetermined level or more in order to efficiently create the compressed video stream. In such case, use of meta data (e.g., rate control, mode decision, or texture information) obtained during image signal processing performed prior to the image compression may enhance the video compression efficiency.

Before compressing the target image, the electronic device may identify state information on the electronic device and determine whether the identified state information meets a designated condition. This is for determining whether to perform the additional VBR compression on the compressed image obtained through the CBR scheme-based compression or simple VBR compression, using the meta data. The state information may be triggered for the additional compression.

The electronic device may compress the target image only when the state information on the electronic device meets a designated condition. The state information may include the remaining space of the memory, image signal processing capability, processable image signal data amount, charging state of the electronic device, the external electronic device connected with the electronic device, or a combination thereof.

The electronic device may determine whether the remaining memory space is within a predetermined range based on, e.g., the remaining memory space information included in the state information and may compress the target image only when the remaining memory space is within the predetermined range.

The electronic device may recognize a server (e.g., a cloud server) connected through the network and may provide the recognized server with an uncompressed image or a compressed image that has undergone simple compression (CBR scheme-based compression or simple VBR compression). In such case, the recompression on the compressed image that has been subjected to simple compression may be performed by the server. The electronic device may receive the compressed image that has been subjected to recompression through the network from the server.

The electronic device may monitor the state of the memory, and upon determining that the memory 430 has an insufficient storage space, the processor 410 may trigger a recompression operation.

For example, as at least a portion of the operation of compressing the target image, the electronic device may be configured to vary at least one of the resolution for at least some section of the target image, image bit rate, image bit depth, image frame rate, image color space, voice bit rate, voice bit depth, and voice sample rate and determine the compression rate for the at least some section based on information according to the variation.

The electronic device may divide the target image into a first section and a second section and may apply different compression rates to the first and second section, respectively.

To that end, the electronic device may be configured to compress the first section by a first scheme and the second section by a second scheme. In such case, the electronic device may generate the meta data with a first meta data corresponding to the first section and second meta data corresponding to the second section. The electronic device may generate the first meta data by referencing the first scheme and the second meta data by referencing the second scheme.

As at least a portion of the operation of compressing the target image, the electronic device may determine the first scheme or the second scheme so that a result of compressing the first section or the second section meets a preset image quality. This is for allowing the compressed images corresponding to the first section and second section to remain at similar quality levels.

The electronic device may identify a section including a region of interest among at least some sections of the target image and determine a scheme for compressing the target image using a bit rate of a level designated for the identified section including the region of interest.

The electronic device may store the compressed bit stream generated by compression in operation 530. The electronic device may store the compressed bit stream in at least one of, e.g., an internal memory, an external memory, and an external device. The stored compressed bit stream may be restored by the electronic device or may be provided at a request from the external device.

Figure 6:
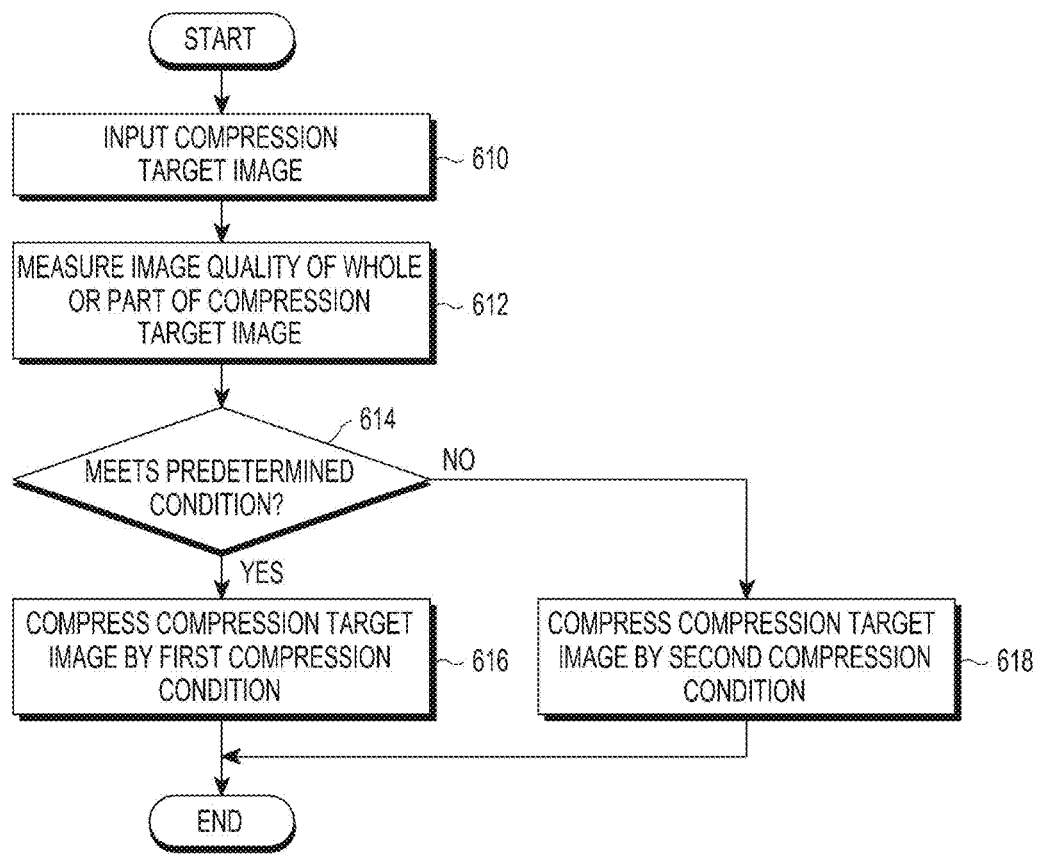
FIG. 6 is a flowchart illustrating the control of performing compression on an electronic device considering meta data according to an embodiment of the present disclosure.

FIG. 6 is a flowchart illustrating the control of performing compression on an electronic device considering meta data according to an embodiment of the present disclosure.

Referring to FIG. 6, the electronic device inputs a compression target image to be compressed in operation 610. The electronic device may generate the compression target image through, e.g., the camera module or by restoring the compressed image provided through the memory or streaming service. When the compression target image is generated through the camera module, the electronic device may perform initial compression, and when the compression target image is generated by restoration, the electronic device may perform recompression.

The electronic device may measure the image quality of the whole or part of the compression target image in operation 612. For example, the electronic device may assess the image quality of the restored or generated compression target image and may detect a high-quality coded area in the compression target image based on a result of the assessment. That is, the electronic device may detect a high-quality coded area having an image quality higher than a predetermined reference by measuring the image quality of the compression target image. For example, the electronic device may measure the image quality of the compression target image based on a PSNR scheme or SSIM scheme and detect the high-quality coded area based on the measured result.

The electronic device may determine whether the measured image quality of the whole or part of the compression target image meets a predetermined condition in operation 614. The electronic device may previously set the condition for determination to a threshold corresponding to, e.g., a reference image quality for determining whether the compression target image is required to be recompressed. However, as the predetermined condition, various conditions for determination may be used or set depending on the user's demands.

When the image quality measured from the compression target image meets the predetermined condition, the electronic device goes to operation 616, and unless the image quality measured from the compression target image meets the predetermined condition, the electronic device may go to operation 618.

The electronic device may compress the whole or part of the compression target image by a first compression condition in operation 616. The electronic device may compress the whole or part of the compression target image by a second compression condition in operation 618.

The electronic device may previously configure the first compression condition considering, e.g., a compression rate desired to be obtained through recompression and the second compression condition considering, e.g., a compression rate desired to be obtained through the initial compression. For example, the initial compression may be compression that is first performed on an image generated by the camera module, and the recompression may be compression that is performed again on an image provided through the memory or streaming service and restored. In such case, the first compression condition may preferably be provided to present a relatively higher compression rate as compared with the second compression condition. Further, the first compression condition and the second compression condition may contain meta data to be referenced for compressing the compression target image. Otherwise, the meta data may be provided through a separate procedure. The schemes for the electronic device to consider meta data for compression have sufficiently been described above, and thus, no detailed description thereof is given below.

According to an embodiment of the present disclosure, the first and second compression condition may determine a QP. The QP denotes a value that may be optionally set to adjust the degree of quantization. As an example, adjustment of the QP may lead to the adjustment of image quality.

The electronic device may record an image compressed by the first compression condition or an image compressed by the second compression condition or transmit the image to an external device.

Figure 7:
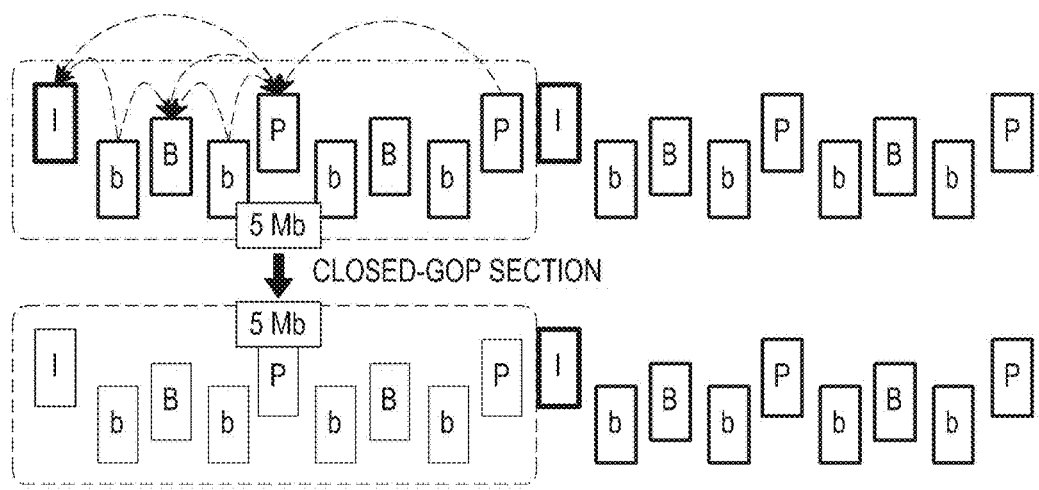
FIG. 7 is a view illustrating a scenario in which an electronic device performs recompression according to an embodiment of the present disclosure.

FIG. 7 is a view illustrating a scenario in which an electronic device performs recompression according to an embodiment of the present disclosure.

Referring to FIG. 7, the electronic device may process recompression on a per-predetermined unit section (GOP) basis. As such, performing recompression on a per-predetermined unit section (GOP) basis may respond to such a situation where the compression abruptly stops. The electronic device may apply different types of compression to a closed GOP section and open GOP section of a GOP.

For example, the electronic device may perform recompression including an infra frame (I-frame or I-slice) to the closed GOP section. In such case, it may be identified that 10 Mb information consisting of an I-frame (or I-slice), a previous frame (or previous frame, P-frame or P-slice) and bidirectional frame (B-frame or B-slice) in the closed GOP section may be compressed into 5 Mb. In the open GOP section, the I-frame (or I-slice) may be maintained as it is while recompression is performed on the P-frame (or P-slice) or B-frame (or B-slice).

Generally, GOP is a basic unit for image compression and may mean a frame collection from one key frame to a next key frame. There may be two options for the GOP; one is scene detection technique, and the other is closed GOP. As an example, in the closed GOP section, compression may be performed with the B frame coming ahead of the next I frame excluded from the GOP configuration.

As set forth above, the electronic device may perform compression using the closed GOP or clean random access (CRA) upon initial video compression to achieve easier video recompression. The CRA may be configured to exclude a particular frame upon compression. The frame (I-frame, B-frame, or P-frame) designated as the CRA may be referenced upon compression. That is, at least one frame present between frames designated as the CRA in a particular frame would be excluded upon compression.

According to an embodiment of the present disclosure, the reason why the compression procedure is performed in GOP units is that the procedure may be independently processed without influencing the video stream when the video processing procedure abruptly stops. As mentioned above, upon recompression in the open-GOP, the electronic device may perform recompression only on the P-frame and B-frame (P/B-slice).

According to an embodiment of the present disclosure, various schemes for utilizing meta data when the electronic device performs image compression may be provided depending on how the meta data is configured.

Figure 8:
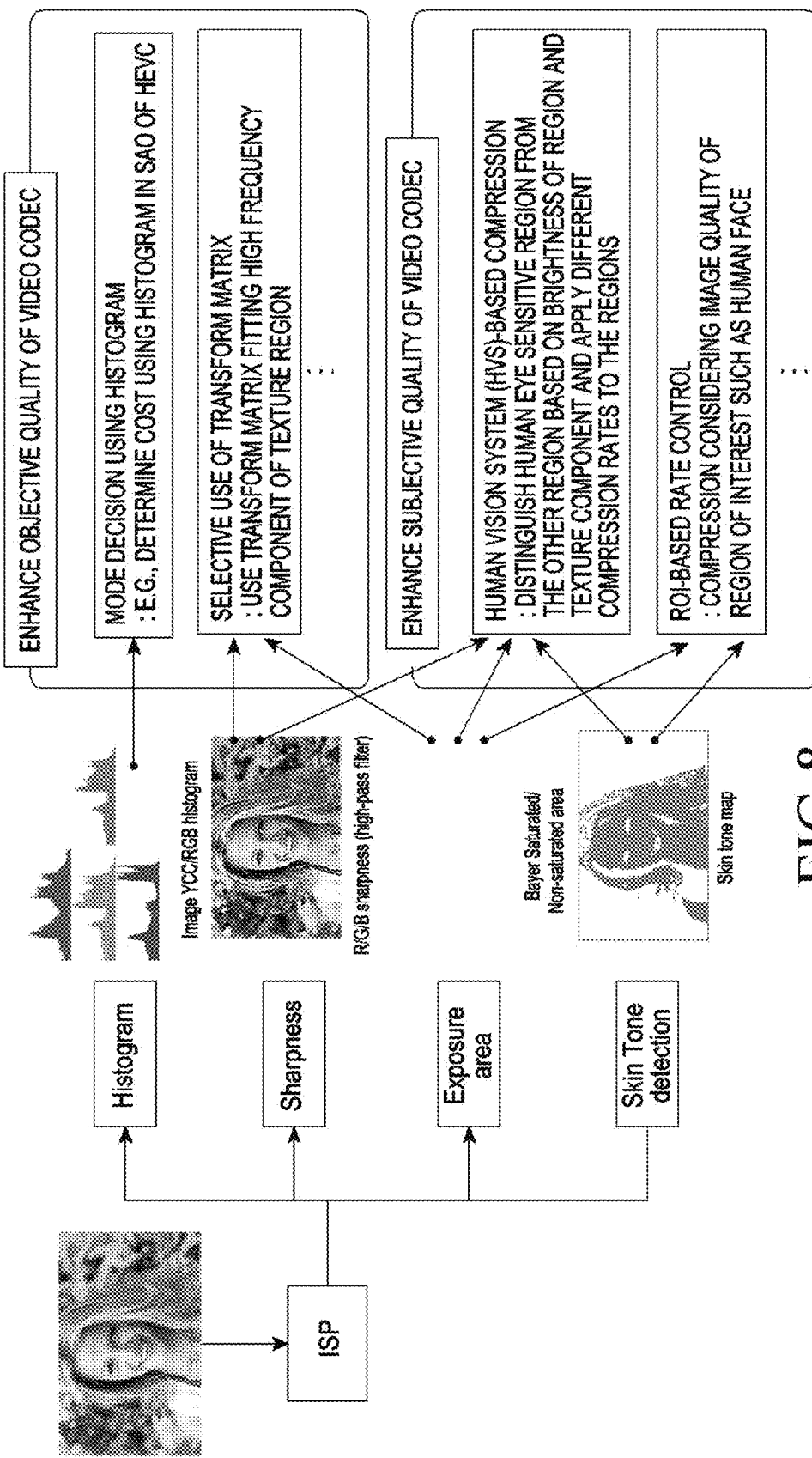
FIG. 8 is a view illustrating an example in which an electronic device compresses or recompresses images based on meta data according to an embodiment of the present disclosure.

FIG. 8 is a view illustrating an example in which an electronic device compresses or recompresses images based on meta data according to an embodiment of the present disclosure.

Referring to FIG. 8, the electronic device may generate various meta data in the ISP when taking a video. Use of, e.g., histogram, sharpness, exposure information, and skin information among the meta data allows for efficient compression or recompression of image.

Figure 9:
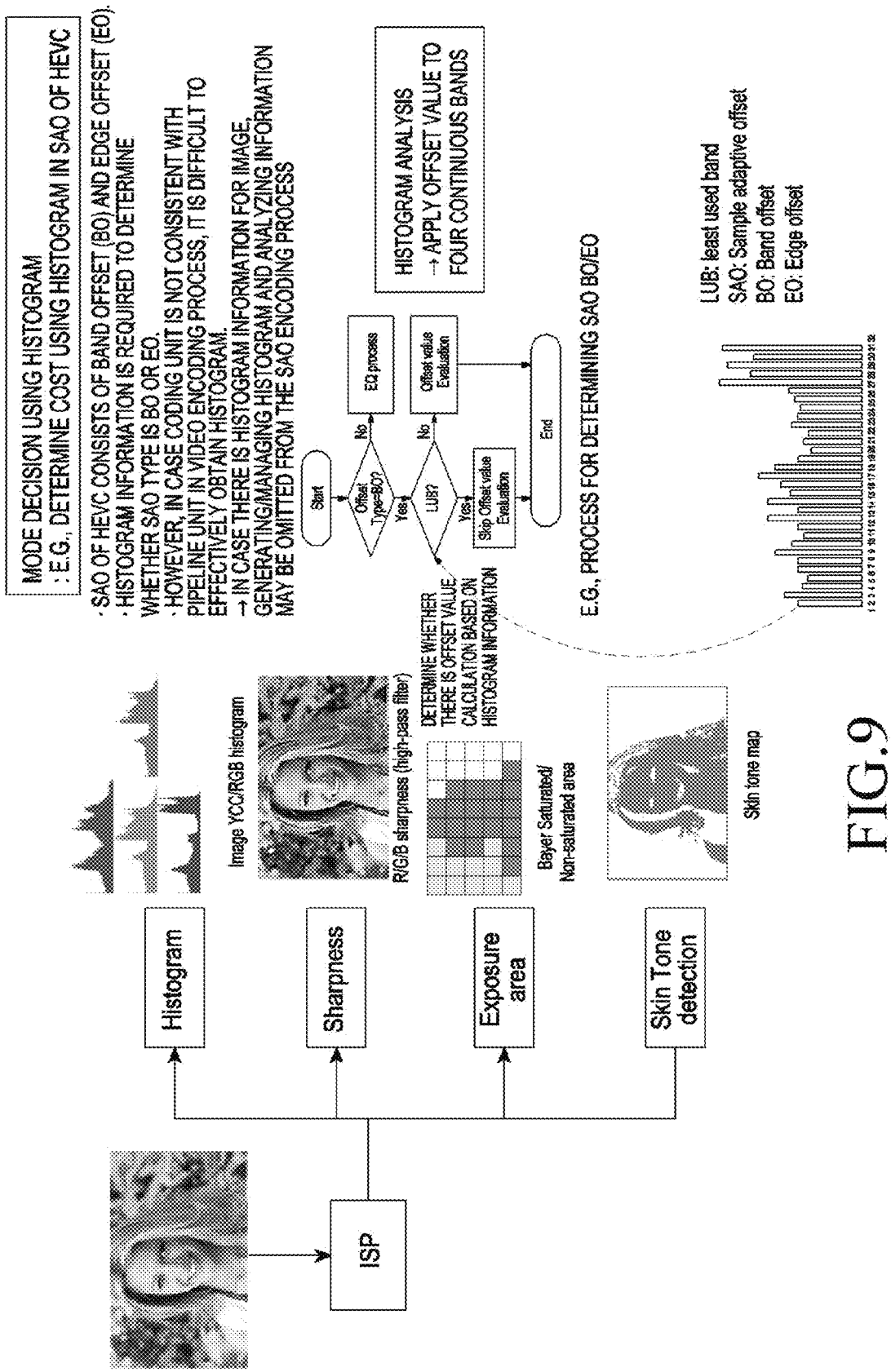
FIG. 9 is a view illustrating a scenario in which an electronic device effectively performs a sample adaptive offset (SAO) process of high efficiency video coding (HEVC) using histogram information according to an embodiment of the present disclosure.

FIG. 9 is a view illustrating a scenario in which an electronic device effectively performs a sample adaptive offset (SAO) process of high efficiency video coding (HEVC) using histogram information according to an embodiment of the present disclosure.

Referring to FIG. 9, the SAO of HEVC consists of a band offset (BO) and an edge offset (EO). The BO and the EO define an adaptive sample offset calculation method. The adaptive sample offset corresponds to in-loop filter technique proposed for calculating an offset value appropriate for each area and reducing quantization errors using the calculated offset value. The BO and the EO define the type of adaptive sample offset. If the BO is used when there is a difference in value from the original pixel in a particular brightness range, it may be an efficient offset calculation method. The EO may be a more efficient offset calculation method in an area including the edge information.

Accordingly, the electronic device may require a process for selecting the SAO type as the BO or EO in order to increase the compression efficiency of SAO. To that end, the electronic device may use histogram information on the image.

Since the electronic device has already obtained the histogram information in the ISP, the electronic device need not repeatedly calculate the histogram information for image compression. This may result in a reduction in the computation complexity for image compression.

Figure 10:
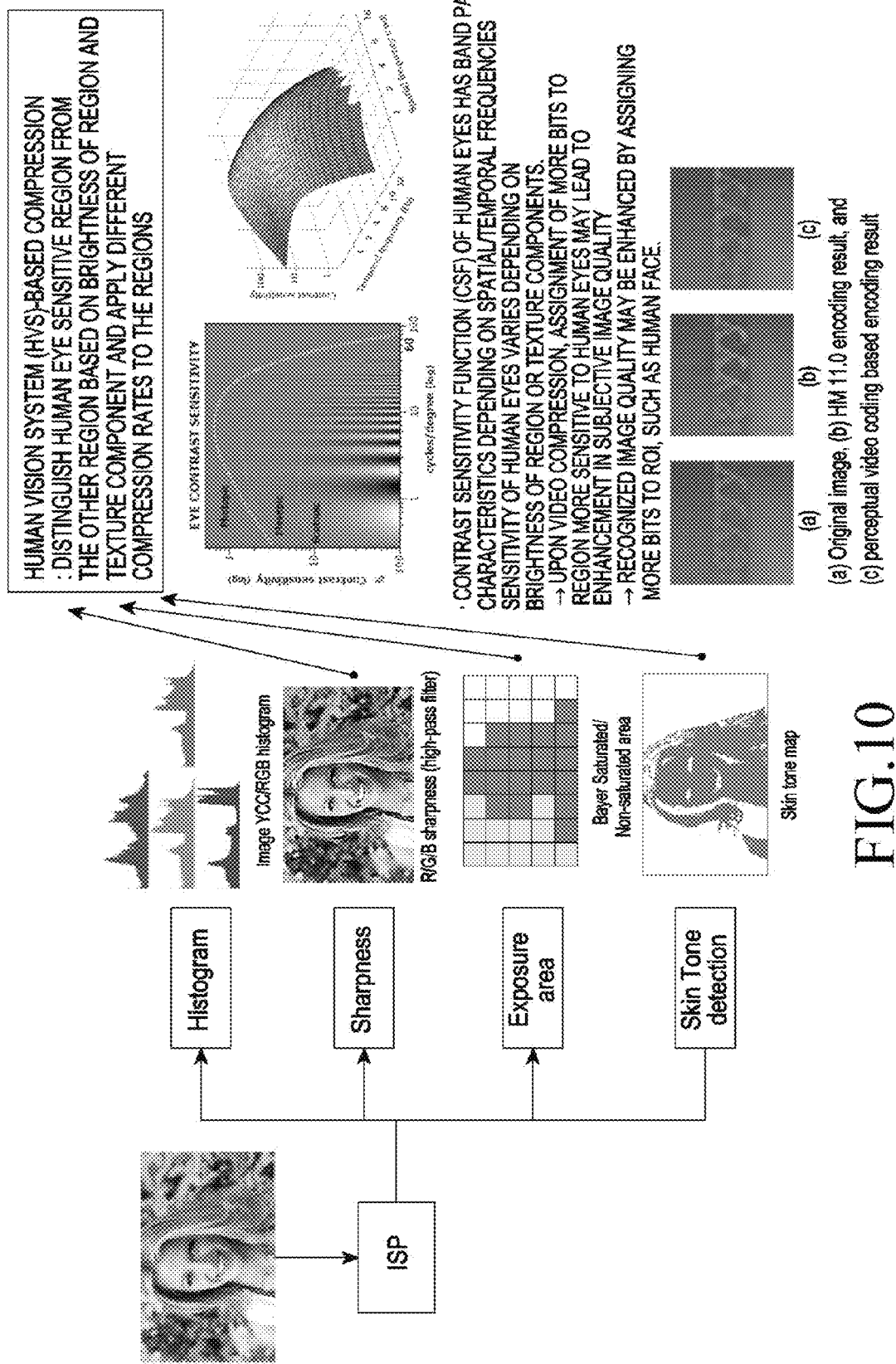
FIG. 10 is a view illustrating an example in which an electronic device utilizes meta data upon perceptual video coding according to an embodiment of the present disclosure.

FIG. 10 is a view illustrating an example in which an electronic device utilizes meta data upon perceptual video coding according to an embodiment of the present disclosure.

Referring to FIG. 10, the human eyes have the characteristics of a band pass filter for contrast sensitivity function (CSF) depending on spatial/temporal frequencies. Accordingly, the human eyes recognize different sensitivities depending on the brightness or texture components of an area in an image. Such characteristics may be used upon image compression. For example, more data may be assigned to an area more sensitive to the human eyes, while less data is assigned to an area less sensitive to the human eyes, thus allowing a higher image quality to be obtained even when the compression is performed at the same compression rate. In particular, an area which people recognize more sensitively, e.g., a human face, may be set to a region on interest (ROI), and per-area bit rate control may be applied to enhance the recognized image quality.

As is apparent from the forgoing description, according to an embodiment of the present disclosure, the video compressing apparatus and method may allow for efficient use of storage space, along with enhanced compression efficiency without quality loss. Further, upon image compression, the processor retains variables generated when obtaining an image and uses the retained variables to perform image compression, rather than analyzing and compressing the image, thus allowing for quick compression operation as well as reduced computation complexity.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
a camera of the electronic device including an image sensor;
an image signal processor (ISP) operably connected with the camera and a processor, and configured to generate meta data including attribute information of image streams obtained by the image sensor of the camera during capturing of a video, wherein the video includes the image streams; and
the processor operably connected with the camera and configured to:
in response to receiving a user request for capturing the video, control the camera to capture the video,
obtain the video with the meta data corresponding to the video, wherein the meta data is generated by the ISP during the capturing of the video,
encode the video,
store the encoded video and the meta data,
compress the encoded video using the meta data generated by the ISP, and
replace the encoded video with the compressed video.

2. The electronic device of claim 1, wherein the attribute information of the image streams includes a color, a brightness, an exposure, a histogram, a region of interest, a sharpness, complexity, a texture, a skin tone, bit rate information, a depth, or a combination thereof, as corresponding to the image streams.

3. The electronic device of claim 1, wherein the processor is further configured to:
identify state information on the electronic device, and when the identified state information meets a predetermined condition, compress the video.

4. The electronic device of claim 3, wherein the state information includes a remaining space of a memory of the electronic device, a capability of the ISP, an amount of data processed by the ISP, a charging state of the electronic device, an external electronic device connected with the electronic device, or a combination thereof.

5. The electronic device of claim 3,
wherein the state information includes a remaining space of a memory of the electronic device, and
wherein the processor is further configured to start to compress the video in response to a determination that the remaining space of the memory of the electronic device is within a predetermined range.

6. The electronic device of claim 1, wherein the processor is further configured, as at least a portion of the operation of compressing the video, to:
vary at least one of a resolution for at least some section of the video, an image bit rate, an image bit depth, an image frame rate, an image color space, a voice bit rate, a voice bit depth, or a voice sample rate, and
determine a compression rate for the at least some section based on the resolution.

7. The electronic device of claim 1,
wherein the processor is further configured to:
compress a first section of the video by a first scheme and a second section of the video by a second scheme, and
wherein the ISP is further configured to:
generate first meta data corresponding to the first section by referencing the first scheme,
generate second meta data corresponding to the second section by referencing the second scheme, and
configure the meta data to include the first meta data and the second meta data.

8. The electronic device of claim 7, wherein the processor is further configured, as at least a portion of the operation of compressing the video, to determine the first scheme or the second scheme so that a result of compressing the first section or the second section meets a preset image quality.

9. The electronic device of claim 1, wherein the processor is further configured to:
identify a section including a region of interest among at least some sections of the video, and
compress the video using a bit rate of a level designated for the identified section including the region of interest.

10. The electronic device of claim 1, wherein the processor is configured to store the meta data, as at least a portion of the image stream, in a memory of the electronic device.

11. The electronic device of claim 1, wherein the ISP is configured to perform the operation of obtaining the image streams in parallel with the operation of generating the meta data.

12. A method for compressing a video on an electronic device, the method comprising:
in response to receiving a user request for capturing a video, controlling a camera of the electronic device to capture the video;
obtaining the video with meta data corresponding to the video, wherein the meta data is generated by an image signal processor (ISP) during the capturing of the video;
encoding the video;
storing the encoded video and the meta data;
compressing the encoded video using the meta data generated by the ISP; and
replacing the encoded video with the compressed video,
wherein the meta data includes attribute information of image streams obtained by an image sensor of the camera during the capturing of the video, and
wherein the video includes the image streams.

13. The method of claim 12, wherein the attribute information of the image streams includes a color, a brightness, an exposure, a histogram, a region of interest, a sharpness, complexity, a texture, a skin tone, bit rate information, a depth, or a combination thereof, as corresponding to the image streams.

14. The method of claim 12,
wherein compressing of the video includes, when state information on the electronic device meets a predetermined condition, compressing the video, and
wherein the state information includes a remaining space of a memory of the electronic device, a capability of the ISP, an amount of data processed by the ISP, a charging state of the electronic device, an external electronic device connected with the electronic device, or a combination thereof.

15. The method of claim 12,
wherein the compressing of the video includes determining a method for compressing the video based on the generated meta data,
wherein the determining of the method for compressing the video includes:
varying at least one of a resolution for at least some section of the video, an image bit rate, an image bit depth, an image frame rate, an image color space, a voice bit rate, a voice bit depth, or a voice sample rate, and
determining a compression rate for the at least some section based on the at least one of the resolution.

16. The method of claim 12, wherein the generating of the meta data includes:
determining a first scheme to compress a first section of the video so that a result of compressing the first section of the video meets a predetermined image quality,
determining a second scheme to compress a second section of the video so that a result of compressing the second section of the video meets the predetermined image quality,
generating first meta data corresponding to the first section by referencing the determined first scheme,
generating second meta data corresponding to the second section by referencing the determined second scheme, and
configuring the meta data to include the first meta data and the second meta data.

17. The method of claim 12, wherein the compressing of the video includes:
identifying a section including a region of interest among at least some sections of the video, and
compressing the video using a bit rate of a level designated for the identified section including the region of interest.

18. The method of claim 12, further comprising storing the meta data, as at least a portion of the image streams, in a memory of the electronic device.

19. A non-transitory computer readable recording medium recording a program, which when executed by a processor, causes the processor to execute:

an operation of controlling a camera of an electronic device to capture a video in response to receiving a user request for capturing the video;

an operation of obtaining the video with meta data corresponding to the video, wherein the meta data is generated by an image signal processor (ISP) during the capturing of the video;

an operation of encoding the video;

an operation of storing the encoded video and the meta data;

an operation of compressing the encoded video using the meta data generated by the ISP; and an operation of replacing the encoded video with the compressed video, wherein the meta data includes attribute information of image streams obtained by an image sensor of the camera during the capturing of the video, and wherein the video includes the image streams.

* * * * *